United States Patent [19]
Toki et al.

[11] Patent Number: 6,086,683
[45] Date of Patent: *Jul. 11, 2000

[54] LOW-MELTING ALLOY AND CREAM SOLDER USING A POWDER OF THE ALLOY

[75] Inventors: Tadahiro Toki, Sagamihara; Masayoshi Yamaguchi, Kokubunji; Koichi Aono, Tachikawa; Hirofumi Sakamoto, Ome; Yasuhide Ogasawara, Kodaira; Masuo Hotta, Akishima; Akihiro Kiyosue, Isehara; Takao Enomoto, Hiratsuka, all of Japan

[73] Assignees: Toshiba Corp.; Alpha Metals of Japan Ltd., both of Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,500

[22] Filed: Jul. 12, 1996

[30] Foreign Application Priority Data

Jul. 13, 1995 [JP] Japan ..................................... 7-177784

[51] Int. Cl.$^7$ ....................................................... B23K 35/34
[52] U.S. Cl. ........................... 148/24; 228/262.9; 420/587
[58] Field of Search ............................... 420/587; 148/24; 228/262.9

[56] References Cited

FOREIGN PATENT DOCUMENTS

| 61-273296 | 2/1986 | Japan . |
| 62-72496 | 4/1987 | Japan . |
| 4-22595 | 1/1992 | Japan . |

*Primary Examiner*—Melvyn Andrews
*Attorney, Agent, or Firm*—McDermott, Will & Emery

[57] ABSTRACT

Ag and Cu are added to a base material of a Sn/Pb/Bi composition. Since Bi is contained in greater quantities in Sn/Pb, the alloy has a low melting point (120 to 150° C.) and is surely melted at reflow temperatures from 170 to 200° C. Preferably, the addition amount of Ag is from 0.1 to 5 wt % and the addition amount of Cu is from 0.05 to 1.0 wt %. A low-melting alloy having all the required performances and excellent with view points of cost and safety and a cream solder using a powder of the alloy can be obtained.

10 Claims, No Drawings

LOW-MELTING ALLOY AND CREAM SOLDER USING A POWDER OF THE ALLOY

BACKGROUND OF THE INVENTION

1. Field of the Invention

The present invention relates to a low-melting alloy and a cream solder using a powder of the alloy, which is improved in strength after melting and solidification while maintaining workability (solderability) in spite of the low melting point thereof.

2. Description of the Prior Art

Upon surface mounting of semiconductor devices such as for printed wiring boards or integrated circuits, a technique for bonding individual constituent devices plays an extremely important role. In particular, improvement in the technique of micro-soldering (soldering for minute portion) is indispensable for enabling high density mounting by increasing the integration degree of LSI substrates.

Then, as a method of exactly mounting minute semiconductor parts at predetermined positions on a circuit substrate, a method of using cream solder has generally been known. That is, semiconductor parts are fixed by utilizing the viscosity and the surface tension of a cream solder deposited in a desired pattern on the circuit substrate by a printing method and, subsequently, the parts are heated, for example, by a hot air or infrared rays to solder the minute parts. Therefore, for the cream solder, demands for workability and reliability have been increased more and more with respect to low reflow temperature (low melting point), good wettability and bonding strength after cooling and solidification.

Generally,, the cream solder is prepared by mixing a powdery metal alloy with a highly viscous paste flux into a creamy state. As the metal powder, for satisfying various demands as described above, eutectic solders of Sn/Pb composition with addition of Bi, In, Cd, etc. have been known (refer, for example, to Japanese Patent Laid-Open Nos. Sho 47-6755, 63-112092 and 63-238994).

However, the conventional metal powder for cream solder involves a problem that two characteristics of low operating temperature and reliability for bonding strength are not always compatible. That is, the Sn/Pb eutectic solder described above is excellent in mechanical strength for the bonded portion, but involves a problem that the operating temperature is higher than 210° C. and can not attain the aimed low soldering temperature.

Bi, In, Cd described above are added for lowering the melting point. The melting point can be controlled by adding such additive elements in a certain ratio to usual soldering alloys. However, among Bi, In and Cd, In is expensive and Cd is toxic, so that they involve a problem also in view of practical use.

The present invention has been accomplished taking notice of such prior art and provides a low-melting alloy having all the performances required as the low-melting alloy for cream solder and also excellent with view points of cost and safety, as well as a cream solder using a powder of the alloy.

SUMMARY OF THE INVENTION

In the low-melting alloy according to the present invention, Ag and Cu are added to a base material of a Sn/Pb/Bi composition.

Since the low-melting alloy according to the present invention contains much Bi as the base material in Sn/Pb, the alloy has a low melting point (120–150° C.) and is melted surely at reflow temperatures of 170 to 200° C.

Bi is used as a metal for providing wettability and low melting point. This is because Bi is not so expensive as In and not toxic as Cd.

Addition of Bi results in the reduction of the mechanical strength in a bonded portion after cooling and solidification, and Ag and Cu are added for preventing the strength reduction in the present invention. Both of Ag and Cu have to be added and it is not until both of them are present that a sufficient effect for preventing reduction of the strength can be provided. This is because such an effect can not be obtained without a synergistic effect of the crystal micronizing effect of Cu and a strength effect of Ag. The addition amount of Ag is from 0.1 to 5 wt % based on the base material of the Sn/Pb/Bi composition. This is because the effect of improving the strength can not be obtained if it is less than 0.1 wt %, whereas the effect can not be increased so much and the cost is increased if it is more than 5 wt %. Further, the addition amount of Cu is from 0.05 to 1.0 wt % based on the Sn/Pb/Bi composition. This is because the crystal micronizing effect can not be obtained if it is less than 0.05 wt %, whereas voids are often formed, failing to obtain the strength if it is greater than 1.0 wt %.

The ratio of the base material of the Sn/Pb/Bi composition is preferably: (20–30)/(balance)/(15–35). If the amount of Bi is more than 8 wt %, it generally results in the reduction of the mechanical strength. However, in the present invention, Bi can be incorporated up to 15 wt % or more since strength reduction is prevented by the addition of Ag and Cu described above.

A cream solder having all the performance such as low reflow temperature, good wettability and bonding strength after cooling and solidification can be obtained by mixing the powder of the low-melting alloy according to the present invention with a paste flux.

The present invention is not restricted only to the foregoing explanation and the objects, advantages, features and application uses of the present invention will become clearer by reading the following descriptions. Further, it should be understood that all adequate modifications made within a range not departing the spirit of the present invention will be contained within the scope of the present invention.

DETAILED DESCRIPTION OF THE PREFERRED EMBODIMENTS

Several kinds of powders prepared by adding Ag and Cu to composition of Sn/Pb/Bi for obtaining low-melting alloys were prepared, and such powders were mixed with a flux to obtain cream solders. Soldering was conducted by using the cream solder at a reflow temperature of 190° C. and a test was conducted for the wettability and the bonding strength. The following Table 1 shows the ingredient ratio and the performance of the low-melting alloys. A same test was also conducted by using cream solders containing low-melting alloys of Sn/Pb/Bi compositions not containing Ag or Cu as comparative examples.

As a test method for the wettability, printing was conducted by using a metal mask of 6.35 ø and 150 μm thickness and an extended area was measured. As a test method for the bonding strength, an L-shaped hook was fastened to each of soldered lead pins of QFP, and pulled at a rate of 20 mm/min. and then the maximum strength upon breakage was measured. Further, as a test for the aging change of the strength, a temperature cycle test between −40° C. and +85° C. on every 15 min. was conducted for 1,000 cycles and the temperature thereafter was measured by the same test method as described above. The result of the former bonding strength test is shown in the following Table 1 and the result of the latter test for the aging change of the strength is shown in Table 2.

TABLE 1

| No. | Final alloy composition [wt %] | | | | | Wett-ability | Bonding strength [gf] |
|---|---|---|---|---|---|---|---|
| | Base material | | | Additive | | | |
| | Sn | Pb | Bi | Ag | Cu | | |
| Example | | | | | | | |
| 1 | 24.5 | balance | 25 | 0.5 | 0.05 | ☆ | 700 |
| 2 | 24 | balance | 25 | 0.5 | 0.5 | ☆ | 740 |
| 3 | 28.5 | balance | 25 | 1 | 0.3 | ☆ | 800 |
| 4 | 28.5 | balance | 25 | 3 | 0.3 | ☆ | 830 |
| 5 | 30 | balance | 25 | 5 | 0.05 | ◎ | 790 |
| 6 | 20 | balance | 25 | 0.1 | 1 | ◎ | 720 |
| 7 | 30 | balance | 20 | 5 | 0.05 | ◎ | 800 |
| 8 | 20 | balance | 20 | 0.1 | 1 | ◎ | 810 |
| 9 | 30 | balance | 35 | 5 | 0.05 | ◎ | 690 |
| 10 | 20 | balance | 35 | 0.1 | 1 | ◎ | 630 |
| Comp. Example | | | | | | | |
| 11 | 30 | balance | 25 | — | — | o | 650 |
| 12 | 25 | balance | 20 | — | — | o | 700 |
| 13 | 20 | balance | 35 | — | — | o | 450 |

☆: excellent
◎: considerably good
o: good

TABLE 2

| No | Final alloy composition [wt %] | | | | | Bonding strength before/after cycle test (−40° C. ← → +85° C.) | |
|---|---|---|---|---|---|---|---|
| | base material | | | Additive | | Before cycle test [gf] | At 1000 cycle [gf] |
| | Sn | Pb | Bi | Ag | Cu | | |
| Example | | | | | | | |
| 1 | 24.5 | balance | 25 | 0.5 | 0.05 | 700 | 630 |
| 2 | 24 | balance | 25 | 0.5 | 0.5 | 740 | 670 |
| 3 | 28.5 | balance | 25 | 1 | 0.3 | 800 | 720 |
| 4 | 28.5 | balance | 25 | 3 | 0.3 | 830 | 930 |
| Comp. Example | | | | | | | |
| 5 | 30 | balance | 25 | — | — | 650 | 450 |

For usual bonding strength, specimens of the examples could be improved in strength while showing predetermined low melting points as compared with comparative examples not containing Ag and Cu as shown in Table 1. For tensile strength after aging, specimens of the examples showed a lower ratio in the strength reduction as compared with comparative examples.

The low-melting alloy according to the present invention, when used as cream solders, can provide both lowering of the melting point by the addition of Bi and improvement in strength by the addition of Ag and Cu simultaneously. In addition, since the strength reduction caused by the addition of Bi can be prevented by the addition of Ag and Cu, Bi can be added in a greater ratio than usual, to enable reflow at a predetermined low operating temperature and, improvement of the strength can be effected. In addition, since no expensive metal or toxic metal is used, the alloy of the invention is excellent also in view of the cost and the safety, and is industrially useful. Further, as a merit in view of mounting, poor heat resistant parts can be used, and materials of low heat resistance can be used for the printed substrates, which enables remarkable lowering of the cost.

What is claimed is:

1. A low-melting alloy having good wettability consisting of Ag and Cu added to a Sn/Pb/Bi base material composition, wherein the weight % of the components in the Sn/Pb/Bi base material composition is: (20–30)Sn/(balance) Pb/(15–35)Bi and 0.1 to 5.0 wt % of Ag and 0.05 to 1.0 wt % of Cu are added, and wherein said alloy has a bonding strength of at least 630 gf.

2. A low-melting alloy having good wettability consisting of Ag and Cu added to a Sn/Pb/Bi base material composition, wherein the weight % of the components in the Sn/Pb/Bi base material composition is: 24.0–28.5)Sn/ (balance)Pb/25Bi and 0.5 to 3.0 wt % of Ag and 0.05 to 0.3 wt % of Cu are added, and wherein said alloy has a bonding strength of at least 630 gf.

3. A low-melting alloy having good wettability consisting of Ag and Cu added to a Sn/Pb/Bi base material composition, wherein the weight % of the components in the Sn/Pb/Bi base material composition is: (20–30)Sn/(balance) Pb/(15–35) Bi and 0.1 wt % of Ag and 0.05 to 0.1 wt % of Cu are added, and wherein said alloy has a bonding strength of at least 630 gf.

4. A cream solder comprising an intimate mixture of a powder of a low-melting alloy as defined in claim 1 and a paste flux.

5. A cream solder comprising an intimate mixture of a powder of a low-melting alloy as defined in claim 2 and a paste flux.

6. A cream solder comprising an intimate mixture of a powder of a low-melting alloy as defined in claim 3 and a paste flux.

7. A method of conducting soldering in an operating temperature range of lower than 200° C. by using the cream solder as defined in claim 4.

8. A method of conducting soldering in an operating temperature range of lower than 200° C. by using the cream solder as defined in claim 5.

9. A method of conducting soldering in an operating temperature range of lower than 200° C. by using the cream solder as defined in claim 6.

10. The low-melting alloy of any one of claims 1–3, wherein said bonding strength represents the maximum strength upon breakage following fastening an L-shaped hook to each of soldered lead pins of QFP, and pulling at a rate of 20 mm/min.

* * * * *